United States Patent
Takemura

(10) Patent No.: US 10,538,660 B2
(45) Date of Patent: Jan. 21, 2020

(54) METHOD FOR PRODUCING DICYCLOPENTADIENE-MODIFIED PHENOLIC RESIN

(71) Applicant: JFE CHEMICAL CORPORATION, Tokyo (JP)

(72) Inventor: Kazuya Takemura, Chiba (JP)

(73) Assignee: JFE CHEMICAL CORPORATION, Tokyo (JP)

( * ) Notice: Subject to any disclaimer, the term of this patent is extended or adjusted under 35 U.S.C. 154(b) by 10 days.

(21) Appl. No.: 15/750,908

(22) PCT Filed: Jul. 28, 2016

(86) PCT No.: PCT/JP2016/003488
§ 371 (c)(1),
(2) Date: Feb. 7, 2018

(87) PCT Pub. No.: WO2017/026099
PCT Pub. Date: Feb. 16, 2017

(65) Prior Publication Data
US 2018/0237633 A1 Aug. 23, 2018

(30) Foreign Application Priority Data

Aug. 7, 2015 (JP) .................................. 2015-157054
May 17, 2016 (JP) .................................. 2016-098436

(51) Int. Cl.
C08G 61/02 (2006.01)
C08L 61/14 (2006.01)
C08G 61/08 (2006.01)
B01J 31/08 (2006.01)

(52) U.S. Cl.
CPC .............. C08L 61/14 (2013.01); C08G 61/08 (2013.01); B01J 31/08 (2013.01)

(58) Field of Classification Search
USPC ....................................................... 528/205
See application file for complete search history.

(56) References Cited

U.S. PATENT DOCUMENTS

| | | |
|---|---|---|
| 4,051,079 A | 9/1977 | Melby |
| 6,001,762 A | 12/1999 | Harmer et al. |
| 2003/0069384 A1 | 4/2003 | McCarthy et al. |

FOREIGN PATENT DOCUMENTS

| | | |
|---|---|---|
| CN | 1298377 A | 6/2001 |
| EP | 0484040 A2 | 5/1992 |
| JP | S63-099224 A | 4/1988 |
| JP | H04-168122 A | 6/1992 |
| JP | H04-339820 A | 11/1992 |
| JP | H07-157538 A | 6/1995 |
| JP | H07-252349 A | 10/1995 |
| JP | 2993727 B2 | 12/1999 |
| JP | 2003-137974 A | 5/2003 |
| JP | 2003-137977 A | 5/2003 |
| JP | 2006-282728 A | 10/2006 |
| JP | 2009-096819 A | 5/2009 |
| KR | 19950013537 B1 | 11/1995 |
| TW | 205560 B | 5/1993 |
| WO | 02085828 A1 | 10/2002 |

OTHER PUBLICATIONS

Jun. 8, 2018 Extended European Search Report issued in European Patent Application No. 16834802.7.
Mar. 15, 2017 Office Action issued in Taiwanese Patent Application No. 105124859.
Jan. 31, 2019 Office Action issued in Korean Patent Application No. 10-2018-7003757.
Oct. 4, 2016 International Search Report issued in International Patent Application No. PCT/JP2016/003488.
Oct. 4, 2016 Written Opinion issued in International Patent Application No. PCT/JP2016/003488.
Aug. 5, 2019 Office Action issued in Chinese Patent Application No. 201680042607.3.
Aug. 28, 2019 Office Action issued in Korean Patent Application No. 10-2018-7003757.

*Primary Examiner* — Terressa Boykin
(74) *Attorney, Agent, or Firm* — Oliff PLC

(57) ABSTRACT

A method for producing a dicyclopentadiene-modified phenolic resin. The method including reusing a fluorine-based ion-exchange resin as a catalyst in a reaction between a phenol and a dicyclopentadiene, the fluorine-based ion-exchange resin having been used as a catalyst when a phenol and a dicyclopentadiene are allowed to react with each other to produce a first dicyclopentadiene-modified phenolic resin. In the method, the fluorine-based ion-exchange resin is washed with an organic solvent. The dicyclopentadiene-modified phenolic resin obtained by the method has a stable quality, has a high purity, and is inexpensive.

15 Claims, No Drawings

METHOD FOR PRODUCING DICYCLOPENTADIENE-MODIFIED PHENOLIC RESIN

TECHNICAL FIELD

The present disclosure relates to a method for producing a dicyclopentadiene-modified phenolic resin. In particular, the present disclosure relates to a method for producing a dicyclopentadiene-modified phenolic resin useful as a raw material of epoxy resins used in, for example, printed circuit boards and semiconductor sealing materials.

BACKGROUND ART

Dicyclopentadiene-modified phenolic resins have a lower dielectric constant and lower hygroscopicity than other phenolic resins. Therefore, resins obtained by epoxidizing the dicyclopentadiene-modified phenolic resins are useful as raw materials of semiconductor sealing agents and printed circuit boards.

Such a dicyclopentadiene-modified phenolic resin is produced by heating a phenol and a dicyclopentadiene in the presence of an acid catalyst. As the acid catalyst for this reaction, Lewis acids such as boron trifluoride, boron trifluoride phenol complex, and boron trifluoride ether complex and protonic acids such as sulfuric acid and para-toluenesulfonic acid have been used. However, any of these catalysts dissolves uniformly in the resulting product and thus cannot be used in recycling, and it is necessary to neutralize the catalyst with an alkali compound such as hydrotalcite or sodium hydroxide after the completion of the reaction. Furthermore, it is necessary to separate and collect the neutralizer and the deactivated catalyst from the product by filtering the reaction solution. Accordingly, there may be problems in that the step is complicated, a neutralizer and a filter aid are necessary, equipment such as a filter is necessary, the production time becomes long due to the filtration, and waste is generated each time the reaction is performed, resulting in an increase in the cost.

Patent Literature 1 discloses, in Claim 1, "a method for producing a phenol polymer, the method including allowing a phenolic compound and dicyclopentadiene to react with each other using a perfluoroalkane sulfonic acid ion-exchange resin as a catalyst". From the 5th line to the 7th line on the upper left section of page (3) discloses that "the reaction is usually performed by thermal polymerization in the absence of a solvent . . . . However, use of a solvent inactive to the reaction does not cause any problem". In addition, Advantageous Effects of Invention of page (4) discloses that "the phenol polymer produced is a good-quality polymer that contains no ionic impurities due to a residue of a catalyst component . . . , and the catalyst can be used repeatedly".

Patent Literature 2 discloses, in Claim 1, a method in which a strongly acidic polystyrene-based ion-exchange resin is used as a catalyst. This method is advantageous in that a neutralizer is unnecessary and the amount of waste is reduced because the catalyst can be repeatedly used without neutralizing the catalyst.

Patent Literature 3 discloses a method for producing dicyclopentadiene-modified phenol by using a fixed-bed flow reactor filled with a solid acid and discloses that a fluorine-based ion-exchange membrane is used as the solid acid. Fluorine-based ion-exchange membranes are advantageous in that degradation due to a chemical reaction is less likely to occur than polystyrene-based ion-exchange resins.

Patent Literature 4 describes a step of dissolving a dicyclopentadiene-modified phenolic resin in an organic solvent, and removing an unreacted monomer, a catalyst, and so forth from the organic solvent with an aqueous solution of an alkali hydroxide (Claim 1). It is also disclosed that hydrochloric acid, sulfuric acid, phosphoric acid, and the like may be used for neutralizing an organic layer (from the 1st line to the 2nd line on the upper left section of page (3)). Patent Literature 5 describes a method for producing a dicyclopentadiene-modified phenolic resin, the method including adding an alkaline compound and zeolite to the resulting reaction product solution to deactivate the acid catalyst (Claim 1).

CITATION LIST

Patent Literature

PTL 1: Japanese Unexamined Patent Application Publication No. 4-168122
PTL 2: Japanese Patent No. 2993727
PTL 3: Japanese Unexamined Patent Application Publication No. 2003-137974
PTL 4: Japanese Unexamined Patent Application Publication No. 63-99224
PTL 5: Japanese Unexamined Patent Application Publication No. 2009-96819

SUMMARY

Technical Problem

Patent Literature 1 discloses the repetitive use of the catalyst. However, Patent Literature 1 neither discloses the need of washing of the catalyst after the catalyst is used a plurality of times nor suggests the method of washing. The polystyrene-based ion-exchange resin used in the method disclosed in Patent Literature 2 has a problem in that the catalyst is easily degraded by being used repeatedly. Specifically, a product is adsorbed in pores of the polystyrene-based ion-exchange resin, or a resin base material is degraded or an acidic group is cleaved by a chemical reaction, resulting in a problem in that properties do not stabilize when the polystyrene-based ion-exchange resin is repeatedly used. Regarding the fluorine-based ion-exchange membrane used in Patent Literature 3, the inventors of the present disclosure studied in detail as a catalyst for synthesizing a dicyclopentadiene-modified phenolic resin. As a result, it was found that the following problem occurred. When the fluorine-based ion-exchange membrane is repeatedly used, a coloring component in a product is adsorbed on the fluorine-based ion-exchange membrane. After the membrane is repeatedly used in a certain period, the amount of adsorption on the membrane is saturated, the coloring component begins to be eluted, and the product is gradually colored. Specifically, use of the fluorine-based ion-exchange membrane has a problem in that when a dicyclopentadiene-modified phenolic resin is repeatedly produced, the color tone of the resin does not stabilize.

In addition, Patent Literatures 4 and 5 do not describe the prevention of coloring of products.

An object of the present disclosure is to solve the above problems in the related art and to provide a method for producing a dicyclopentadiene-modified phenolic resin, in which resin properties and the color tone stabilize when a catalyst is repeatedly used, and the catalyst can be repeatedly used enough times. Also provided is a method capable of preventing coloring of a resin obtained in the production of a dicyclopentadiene-modified phenolic resin.

Solution to Problem

As a result of extensive studies of a method for producing a dicyclopentadiene-modified phenolic resin, the inventors of the present disclosure found that the above problems are solved by repeatedly using a fluorine-based ion-exchange resin as a catalyst, and washing the ion-exchange resin with an organic solvent in advance prior to use. Furthermore, the inventors found that when a production method including purifying a product, which will be described later, is employed, coloring of the resulting resin can be prevented. Use of these two production methods enables a dicyclopentadiene-modified phenolic resin with less coloring to be obtained by a low-cost production method.

Specifically, the disclosed exemplary embodiments of the present disclosure include the following.

(1) A method for producing a dicyclopentadiene-modified phenolic resin, the method including reusing a fluorine-based ion-exchange resin as a catalyst in a reaction between a phenol and a dicyclopentadiene, the fluorine-based ion-exchange resin having been used as a catalyst when a phenol and a dicyclopentadiene are allowed to react with each other to produce a dicyclopentadiene-modified phenolic resin, in which the fluorine-based ion-exchange resin to be reused, the fluorine-based ion-exchange resin having been washed with an organic solvent, is used at least once when reused (hereinafter may be referred to as "a production method of the present disclosure").

(2) The method for producing a dicyclopentadiene-modified phenolic resin according to (1), in which the fluorine-based ion-exchange resin is washed with an organic solvent and reused at least once before a number of times of repeated use exceeds 30.

(3) The method for producing a dicyclopentadiene-modified phenolic resin according to (1) or (2), in which when a contaminated state of the fluorine-based ion-exchange resin to be reused is measured and a predetermined standard is not satisfied, the fluorine-based ion-exchange resin is washed with an organic solvent and reused.

(4) The method for producing a dicyclopentadiene-modified phenolic resin according to (3), in which the measurement of the contaminated state is a measurement of a spectroscopic spectrum of a solvent extract of the fluorine-based ion-exchange resin to be reused.

(5) The method for producing a dicyclopentadiene-modified phenolic resin according to any one of (1) to (4), in which the organic solvent for washing the fluorine-based ion-exchange resin to be reused is a phenol.

(6) A method for producing a dicyclopentadiene-modified phenolic resin, the method including dissolving, in a soluble solvent, the dicyclopentadiene-modified phenolic resin produced by the method for producing a dicyclopentadiene-modified phenolic resin according to any one of (1) to (5), adjusting a pH of the resulting solution to 5 to 10, and subsequently removing the soluble solvent to obtain a dicyclopentadiene-modified phenolic resin (hereinafter may be referred to as "a production method including purifying a product").

(7) A fluorine-based ion-exchange resin catalyst, the catalyst being reusable, in which an extract of the fluorine-based ion-exchange resin catalyst has a light transmittance of 40% or more.

(8) A method for producing a dicyclopentadiene-modified phenolic resin, the method including reusing a fluorine-based ion-exchange resin whose extract has a light transmittance of 40% or more when a phenol and a dicyclopentadiene are allowed to react with each other to produce a dicyclopentadiene-modified phenolic resin.

Advantageous Effects

According to the method for producing a dicyclopentadiene-modified phenolic resin of the present disclosure, properties and the color tone of a reaction product obtained when a catalyst is repeatedly used stabilize, the production can be repeatedly performed enough times, continuous production can be realized, and a dicyclopentadiene-modified phenolic resin having a good quality can be obtained at a low cost. Furthermore, a separate use of the production method including purifying a product enables coloring of the resulting resin to be reduced.

DESCRIPTION OF EMBODIMENTS

Hereinafter, the disclosed exemplary embodiments of the present disclosure will be described.
<Phenols>
Phenols used in the production method of the present disclosure are aromatic compounds having a phenolic hydroxyl group and are not particularly limited. Examples thereof include monovalent phenols, divalent phenols, and trivalent phenols. Preferred examples thereof include phenol, o-cresol, m-cresol, p-cresol, dimethylphenols such as 2,6-xylenol, naphthols, and mixtures thereof. Of these, phenol is most preferably used from the viewpoint of properties of the resulting resin and economic efficiency.
<Dicyclopentadienes>
Dicyclopentadienes used in the present disclosure (hereinafter, may be referred to as DCPD) are not particularly limited. Preferred examples thereof include dicyclopentadiene, dicyclopentadienes substituted with at least one alkyl group or vinyl group, and mixtures thereof. The alkyl group is, for example, a methyl group or an ethyl group. In particular, dicyclopentadiene is preferably used from the viewpoint of properties of the resulting resin and availability.

In the case where a phenol and a dicyclopentadiene are allowed to react with each other, the softening point and the molecular weight of the resulting phenolic resin can be adjusted by adjusting the charging ratio. An increase in the charging ratio of phenol decreases the softening point and the molecular weight. A decrease in the charging ratio of phenol increases the softening point and the molecular weight. The suitable range of the charging ratio of a phenol and a dicyclopentadiene is not particularly limited but is preferably phenol/dicyclopentadiene=1/1 to 20/1 (molar ratio). If the ratio of phenol is lower than or higher than the above, industrial use of the resin to be produced is limited.
<Catalyst>
In the present disclosure, a fluorine-based ion-exchange resin is used as a catalyst. An acidic group of the fluorine-based ion-exchange resin is not particularly limited. Examples of the fluorine-based ion-exchange resin include those having a sulfonic group or a carboxyl group. Of these, fluorine-based ion-exchange resins having a sulfonic group, the ion-exchange resins having good reactivity, recyclability, and chemical stability are preferred.

The shape of the fluorine-based ion-exchange resin that can be used is, for example, a membrane shape, a pellet shape, a powder shape, or a fiber shape. A membrane-shaped fluorine-based ion-exchange resin reinforced with Teflon (registered trademark) fibers can also be used.

A specific example of the fluorine-based ion-exchange resin that can be used is Nafion available from DuPont, which is a perfluorocarbon resin constituted by hydrophobic Teflon (registered trademark) backbone and a perfluoro side chain having a sulfonic group and is a copolymer of tetrafluoroethylene and perfluoro[2-(fluorosulfonylethoxy)propylvinyl ether].

Regarding the shape, a membrane-like ion-exchange resin that can be easily recycled, or a membrane-like fluorine-based ion-exchange resin reinforced with Teflon (registered trademark) fibers are preferable. Furthermore, from the viewpoint of a high membrane strength, a membrane-like fluorine-based ion-exchange resin reinforced with Teflon (registered trademark) fibers is most preferable.

The content of the acidic group in a fluorine-based ion-exchange membrane that is preferably used in the production method of the present disclosure is not particularly limited but is 0.1 to 10 meq/g and preferably 0.2 to 5 meq/g in terms of ion-exchange capacity (meq/g) represented by milliequivalent of ions that can be exchanged per unit mass. The ion-exchange capacity can be usually determined from, for example, acid-base titration, quantification of sulfur atom, or FT-IR.

An ion-exchange capacity in this range is preferable because coloring of the resulting product is suppressed and a sufficient rate of reaction is obtained. In the production method of the present disclosure, the fluorine-based ion-exchange resin to be reused is preferably washed with an organic solvent in advance prior to use, as required.

The reason for this is as follows. The reason below will be described using a fluorine-based ion-exchange membrane. However, it is obvious for those skilled in the art that the same description can be given using a fluorine-based ion-exchange resin having any shape such as a membrane, a pellet, a powder, or a fiber.

As a result of studies on the repetitive production of a DCPD-modified phenol by using a fluorine-based ion-exchange membrane, the inventors of the present disclosure found that the following problem occurred. When the catalyst is repeatedly used, a coloring component in a product is adsorbed on the fluorine-based ion-exchange resin. After the resin is repeatedly used in a certain period, the amount of adsorption on the resin is saturated, the coloring component begins to be eluted, and the product is gradually colored. Thus, the inventors of the present disclosure found a new problem to be solved.

Specifically, use of the fluorine-based ion-exchange resin has a problem in that when the production is repeatedly performed, the color tone does not stabilize. As a result of extensive studies regarding this new problem, the inventor of the present disclosure found that, as a countermeasure therefor, it is effective to wash the coloring component adsorbed on the resin with an organic solvent.

<Washing of Catalyst>

Examples of the organic solvent used in washing of the fluorine-based ion-exchange resin include, but are not particularly limited to, organic solvents that are usually used, such as acetone, benzene, toluene, dimethyl sulfoxide, ethanol, methanol, and methyl ethyl ketone; and raw materials used in the reaction, such as phenols and dicyclopentadienes. Of these, phenols are preferably used from the viewpoint that removal from the fluorine-based ion-exchange resin is not necessary after washing and the fluorine-based ion-exchange resin can be reused without further treatment. The fact that a solvent active in the reaction could be used was a surprising result. As the phenols, compounds cited as examples of the raw material are suitably used. Of these, phenol, which has a low melting point, is preferred.

The temperature during washing with an organic solvent is also not particularly limited but is preferably 50° C. to 150° C. and more preferably 80° C. to 120° C. A temperature higher than this temperature tends to cause degradation of the catalyst. A temperature lower than this temperature decreases the washing effect.

The time of washing with a solvent is also not particularly limited but is usually 10 minutes to 5 hours and preferably 30 minutes to 3 hours.

In the present disclosure, the washing of the fluorine-based ion-exchange resin with an organic solvent may be performed each time of the reaction or once in a plurality of times. The washing with an organic solvent is preferably performed at least once before the number of times of repeated use exceeds 30. When the number of times of washing is less than the number described above, coloring of the resulting product significantly occurs. On the other hand, performing the washing each time is complicated and increases the cost. Accordingly, the washing with an organic solvent is preferably performed at a frequency as low as possible while checking that coloring does not significantly occur.

In this case, regarding the timing of washing of a fluorine-based ion-exchange membrane with an organic solvent, a part of the catalyst is sampled, a spectroscopic spectrum of a solvent extract of the catalyst is measured, and the timing of the washing is determined on the basis of the intensity of the spectroscopic spectrum. The washing of the fluorine-based ion-exchange membrane is preferably performed at this timing. A UV-visible spectrum is most preferably used as the spectroscopic spectrum. That is, it is preferable to perform this analysis because the timing at which the washing with an organic solvent is necessary can be determined, performing the washing each time becomes unnecessary, and thus the frequency of the washing with an organic solvent can be reduced.

Specifically, the sampled catalyst is stirred in an organic solvent such as tetrahydrofuran (THF), acetone, or the like to extract an adsorbed component, and the solvent is evaporated to collect a solid component. A spectroscopic spectrum is measured by using a solution of the solid component having a predetermined concentration. Preferably, the relationship between the color tone of the product and the intensity of the spectroscopic spectrum of the extract of the catalyst is examined in advance in a preliminary experiment to set a threshold, and the washing with a solvent is preferably conducted at the time when the intensity exceeds the threshold. For example, a UV-visible spectrum, an infrared spectrum, a fluorescence spectrum, or a differential refractometer can be used for the spectroscopic spectrum. The extract may be dissolved in THF, acetone, an alcohol, or the like and then analyzed. An example of the method for measuring the spectrum is a method in which an absorption intensity at a particular wavelength is measured to check the color tone. Of the above-mentioned spectra, a UV-visible spectrum is preferably used in view of good sensitivity and accuracy. The wavelength for the measurement of the absorption intensity is preferably 200 to 700 nm from the viewpoint of high sensitivity. It is necessary to appropriately set a specific time at which the washing treatment with a solvent is conducted. For example, the timing is preferably set to a time when a light transmittance of a 1% THF solution of an extract of the catalyst at 450 nm becomes 40% or less, 50% or less, and more preferably 60% or less.

In the production method of the present disclosure, a fluorine-based ion-exchange resin catalyst may be washed with an organic solvent in the course of the production in the method, or a reusable fluorine-based ion-exchange resin catalyst may be used from the start of the production. A reusable fluorine-based ion-exchange resin catalyst used in another step can be used as a reusable catalyst in the production method of the present disclosure when, for example, a light transmittance of a 1% THF solution of an extract of the catalyst at 450 nm is 40% or more, 50% or more, and more preferably 60% or more.

A dicyclopentadiene-modified phenolic resin obtained by the production method of the present disclosure has a stable quality and a high purity and is inexpensive.

In the method for producing a dicyclopentadiene-modified phenolic resin, preferably, a dicyclopentadiene-modified phenolic resin is produced by using a phenol and a dicyclopentadiene serving as the raw materials described above, the resulting modified phenolic resin is dissolved in a solvent in which the resin is soluble, an acidic compound and/or an alkaline compound are added to the resulting resin solution to adjust the pH of the resin solution to 5 to 10 and preferably 6 to 9, and the soluble solvent is then removed to collect the resulting product. When the pH is less than 5, a red color may develop in some cases. When the pH is more than 10, a blue color may develop in some cases.

The soluble solvent is not particularly limited as long as dicyclopentadiene-modified phenolic resins dissolve in the solvent. From the viewpoint of solubility and availability, the soluble solvent is preferably at least one selected from toluene, xylene, benzene, tetrahydrofuran, methyl ethyl ketone, and methyl isobutyl ketone.

The alkaline compound is not particularly limited. From the viewpoint of availability, the alkaline compound is preferably at least one selected from sodium hydroxide, potassium hydroxide, calcium hydroxide, and magnesium hydroxide.

The acidic compound is preferably at least one selected from para-toluenesulfonic acid, oxalic acid, acetic acid, hydrochloric acid, and sulfuric acid from the viewpoint of availability.

It is preferable to dissolve a modified phenolic resin thus obtained in a soluble solvent and to adjust the pH to 5 to 10 because the coloring of the dicyclopentadiene-modified phenolic resin becomes light and industrial use of the resin increases. This production method may be used not only as the above-described production method of the present disclosure in which a catalyst is repeatedly used but also as an independent method for producing a dicyclopentadiene-modified phenolic resin.

Use in combination of the method for producing a dicyclopentadiene-modified phenolic resin, the method including reusing a fluorine-based ion-exchange resin catalyst, and the production method including dissolving the resulting dicyclopentadiene-modified phenolic resin in a soluble solvent and purifying the resulting product in a particular step is industrially useful because coloring of the dicyclopentadiene-modified phenolic resin obtained by a simple production method can be made lighter.

Hereinafter, the exemplary embodiments will be described in more detail by way of Examples.

EXAMPLES

The exemplary embodiments will now be described specifically with reference to Examples and Comparative Examples. However, the present disclosure is not limited to the Examples.

<Methods for Evaluating Properties of Examples and Comparative Examples>

The softening point of a product resin was measured in a glycerin bath at a temperature-increasing rate of 5° C./min by using a ring-and-ball softening point tester (available from MEITECH Company, Ltd., Model: 25D5-ASP-MG).

Regarding the molecular weight and the amount of a main component of a product resin, the weight-average molecular weight and the number-average molecular weight in terms of polystyrene were determined by using a GPC system (LC20A, CBM-20A, CTO-20A, SIL-20A, and RID-20A) available from Shimadzu Corporation.

The degree of coloring of a product resin was measured by dissolving the product resin in THF to prepare a 1% THF solution and using a UV-1650PC UV-visible spectrophotometer available from Shimadzu Corporation. The evaluation was performed with a light transmittance at a wavelength of 450 nm.

Example 1

To a 1 L reaction container (separable flask) equipped with a stirring device, a thermometer, a reflux device, an inert gas inlet tube, and an oil bath, 250 g (2.66 mol) of phenol (available from Wako Pure Chemical Industries, Ltd.) was charged and heated to 80° C. After the completion of the heating, 16 g of a fluorine-based ion-exchange membrane (Nafion 117 available from DuPont, ion-exchange capacity: 0.9 meq/g) was cut into 2 cm square and charged therein. After the temperature was increased to 105° C., 22 g of dicyclopentadiene was charged in a dropping funnel and added dropwise for a period of 30 minutes. At this time, the dropping speed was adjusted such that the temperature did not exceed 110° C. Subsequently, the temperature was increased to 120° C., and the reaction was conducted for 6 hours. After the completion of the reaction, only the resulting reaction solution was placed in a 1 L separable flask equipped with a reduced-pressure distillation device. The temperature of the oil bath was set to 210° C., and the phenol was distilled at ordinary pressure for one hour and at a reduced pressure for one hour.

The resulting product was cooled and pulverized, and physical properties of the product were evaluated.

The fluorine-based ion-exchange membrane used here was reused, and the same experiment was repeated a total of 20 times. In each recycling, a part (0.1 g) of the catalyst was sampled and stirred together with 100 g of THF to extract a component adsorbed on the catalyst. The extracted solution was then concentrated to obtain an adsorbed product. A 1% THF solution of this extract was prepared, and a UV-visible spectrum of the solution was measured. According to the results of the measurement of a light transmittance at a wavelength of 450 nm, a decrease in the light transmittance was observed in the 8th recycle. Accordingly, the whole of the catalyst was washed at a temperature of 100° C. for one hour in phenol in an amount of 10 times the amount of the catalyst. The washed catalyst was collected by filtering and used again in the synthesis reaction in the 9th recycle and thereafter. Since a decrease in the light transmittance of an extract of the catalyst was also observed after the 17th recycle, the catalyst was similarly washed with phenol and reused. For the produced resin, a 1% THF solution of the produced resin was prepared and a UV-visible spectrum of the solution was measured as in the extract of the catalyst to evaluate the degree of coloring. Tables 1 to 4 show the results of the molecular weight, the softening point, and the light transmittance of the product and the light transmittance of the extract of the catalyst when the synthesis was repeatedly conducted.

Comparative Example 1

A synthesis experiment similar to that in Example 1 was repeated 14 times without performing the washing of the catalyst with phenol. Tables 1 to 4 show the results.

Example 2

A synthesis experiment similar to that in Example 1 was repeated 14 times except that a fluorine-based ion-exchange resin membrane reinforced with Teflon (registered trademark) fibers (Nafion 324, ion-exchange capacity: 1.0 meq/g) was used as a fluorine-based ion-exchange resin membrane. The catalyst was washed with phenol in the 8th recycle. Tables 1 to 4 show the results.

Example 3

A synthesis experiment similar to that in Example 1 was repeated 14 times except that a particulate fluorine-based ion-exchange resin (Nafion NR50, ion-exchange capacity: 0.8 meq/g) was used instead of the fluorine-based ion-exchange resin membrane. The catalyst was washed with phenol in the 7th recycle. Tables 1 to 4 show the results.

Example 4

A synthesis experiment similar to that in Example 1 was conducted except that the solvent for washing the catalyst was changed as described below.

After the completion of the 8th cycle, acetone was used as the solvent for washing. After the completion of the 17th cycle, methyl ethyl ketone was used as the solvent for washing. After the washing, the ion-exchange membrane was dried and then used for the synthesis experiment.

Comparative Example 2

A particulate polystyrene-based ion-exchange resin (DOWEX available from The Dow Chemical Company) was used instead of the fluorine-based ion-exchange resin. A synthesis experiment similar to that in Example 1 was conducted. The same experiment was repeated a total of 10 times. Tables 1 to 4 show the results.

TABLE 1

(1) Light transmittance (%) of extract of catalyst.

| | Catalyst | The number of times of use (times) | | | | | | | | | | | | | | | | | | | | Washing timing of catalyst and solvent used |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | |
| Example 1 | Fluorine-based ion-exchange membrane | 63 | 62 | 65 | 62 | 65 | 65 | 58 | 43 | 68 | 63 | 67 | 65 | 70 | 68 | 62 | 58 | 46 | 63 | 65 | 70 | (1) After completion of the 8th cycle: phenol (2) After completion of the 17th cycle: phenol |
| Example 2 | Fluorine-based ion-exchange membrane reinforced with Teflon fiber | 64 | 63 | 67 | 64 | 62 | 64 | 63 | 46 | 62 | 65 | 65 | 67 | 72 | 65 | — | — | — | — | — | — | (1) After completion of the 8th cycle: phenol |
| Example 3 | Particulate fluorine-based ion-exchange resin | 62 | 69 | 68 | 68 | 63 | 65 | 48 | 67 | 67 | 62 | 63 | 62 | 66 | 55 | — | — | — | — | — | — | (1) After completion of the 7th cycle: phenol |
| Example 4 | Fluorine-based ion-exchange membrane | 64 | 63 | 64 | 63 | 64 | 65 | 59 | 42 | 67 | 62 | 66 | 64 | 69 | 67 | 61 | 57 | 45 | 62 | 63 | 69 | (1) After completion of the 8th cycle: acetone (2) After completion of the 17th cycle: methyl ethyl ketone |
| Comparative Example 1 | Fluorine-based ion-exchange membrane | 63 | 62 | 65 | 62 | 65 | 65 | 58 | 43 | 35 | 30 | 28 | 25 | 25 | 24 | — | — | — | — | — | — | None |
| Comparative Example 2 | Polystyrene-based ion-exchange resin | 68 | 53 | 48 | 43 | 46 | 42 | 35 | 34 | 37 | 38 | — | — | — | — | — | — | — | — | — | — | None |

TABLE 2

(2) Light transmittance (%) of product.

| | Catalyst | The number of times of use (times) | | | | | | | | | | | | | | | | | | | | Washing timing of catalyst and solvent used |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | |
| Example 1 | Fluorine-based ion-exchange membrane | 78 | 82 | 86 | 75 | 79 | 82 | 78 | 68 | 83 | 85 | 83 | 82 | 85 | 79 | 78 | 78 | 69 | 83 | 84 | 85 | (1) After completion of the 8th cycle: phenol |

TABLE 2-continued (2) Light transmittance (%) of product,

| | Catalyst | \multicolumn{20}{c}{The number of times of use (times)} | Washing timing of catalyst and solvent used |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | |
| Example 2 | Fluorine-based ion-exchange membrane reinforced with Teflon fiber | 78 | 82 | 86 | 75 | 79 | 82 | 78 | 68 | 83 | 85 | 81 | 85 | 79 | 78 | — | — | — | — | — | — | (2) After completion of the 17th cycle: phenol (1) After completion of the 8th cycle: phenol |
| Example 3 | Particulate fluorine-based ion-exchange resin | 79 | 82 | 76 | 71 | 79 | 72 | 64 | 76 | 73 | 75 | 78 | 72 | 76 | 76 | — | — | — | — | — | — | (1) After completion of the 7th cycle: phenol |
| Example 4 | Fluorine-based ion-exchange membrane | 78 | 82 | 85 | 75 | 79 | 81 | 79 | 68 | 84 | 85 | 84 | 82 | 84 | 79 | 77 | 78 | 70 | 82 | 84 | 85 | (1) After completion of the 8th cycle: acetone (2) After completion of the 17th cycle: methyl ethyl ketone |
| Comparative Example 1 | Fluorine-based ion-exchange membrane | 78 | 82 | 86 | 75 | 79 | 82 | 78 | 72 | 57 | 54 | 49 | 45 | 44 | 42 | — | — | — | — | — | — | None |
| Comparative Example 2 | Polystyrene-based ion-exchange resin | 78 | 62 | 52 | 54 | 57 | 53 | 58 | 52 | 56 | 54 | — | — | — | — | — | — | — | — | — | — | None |

TABLE 3

(3) Softening point (° C.) of product,

| | Catalyst | \multicolumn{11}{c}{The number of times of use (times)} |
|---|---|---|---|---|---|---|---|---|---|---|---|---|
| | | 1 | 2 | 3 | 4 | 5 | 6 | 7 | 8 | 9 | 10 | 11 |
| Example 1 | Fluorine-based ion-exchange membrane | 83.5 | 85.0 | 85.6 | 83.3 | 84.9 | 83.6 | 84.8 | 84.8 | 84.4 | 84.5 | 84.5 |
| Example 2 | Fluorine-based ion-exchange membrane reinforced with Teflon fiber | 82.5 | 84.0 | 85.2 | 84.3 | 83.9 | 85.6 | 86.8 | 85.2 | 85.4 | 83.8 | 83.5 |
| Example 3 | Particulate fluorine-based ion-exchange resin | 81.5 | 82.0 | 84.2 | 84.7 | 85.2 | 84.6 | 85.8 | 84.2 | 85.4 | 84.8 | 82.5 |
| Example 4 | Fluorine-based ion-exchange membrane | 85.6 | 83.3 | 84.9 | 83.6 | 84.8 | 84.8 | 84.4 | 84.5 | 84.5 | 83.7 | 85.6 |
| Comparative Example 1 | Fluorine-based ion-exchange membrane | 85.5 | 85.7 | 84.6 | 83.8 | 85.9 | 83.1 | 87.8 | 83.8 | 84.9 | 85.5 | 83.7 |
| Comparative Example 2 | Polystyrene-based ion-exchange resin | 84.5 | 84.7 | 83.6 | 74.3 | 75.2 | 68.9 | 71.2 | 68.1 | 60.2 | 69.2 | — |

| | \multicolumn{9}{c}{The number of times of use (times)} | Washing timing of catalyst and solvent used |
|---|---|---|---|---|---|---|---|---|---|---|
| | 12 | 13 | 14 | 15 | 16 | 17 | 18 | 19 | 20 | |
| Example 1 | 83.7 | 85.6 | 84.6 | 85.3 | 83.8 | 84.6 | 85.0 | 83.7 | 84.6 | (1) After completion of the 8th cycle: phenol (2) After completion of the 17th cycle: phenol |

TABLE 3-continued (3) Softening point (° C.) of product,

| | | | | | | | | | | |
|---|---|---|---|---|---|---|---|---|---|---|
| Example 2 | 83.6 | 84.6 | 85.6 | — | — | — | — | — | — | (1) After completion of the 8th cycle: phenol |
| Example 3 | 84.0 | 85.2 | 84.3 | — | — | — | — | — | — | (1) After completion of the 7th cycle: phenol |
| Example 4 | 84.6 | 85.3 | 83.8 | 84.6 | 85.0 | 83.7 | 84.6 | 83.9 | 84.3 | (1) After completion of the 8th cycle: acetone (2) After completion of the 17th cycle: methyl ethyl ketone |
| Comparative Example 1 | 85.6 | 83.6 | 85.1 | — | — | — | — | — | — | None |
| Comparative Example 2 | — | — | — | — | — | — | — | — | — | None |

TABLE 4

(4) Molecular weight (Mw) of product,

| | | The number of times of use (times) | | | | | | | | | | |
|---|---|---|---|---|---|---|---|---|---|---|---|---|
| | Catalyst | 1 | 2 | 3 | 4 | 5 | 6 | 7 | 8 | 9 | 10 | 11 |
| Example 1 | Fluorine-based ion-exchange membrane | 529 | 529 | 530 | 528 | 530 | 525 | 538 | 532 | 547 | 550 | 552 |
| Example 2 | Fluorine-based ion-exchange membrane reinforced with Teflon fiber | 524 | 523 | 525 | 530 | 528 | 533 | 538 | 521 | 528 | 546 | 555 |
| Example 3 | Particulate fluorine-based ion-exchange resin | 534 | 528 | 535 | 532 | 538 | 534 | 528 | 529 | 538 | 545 | 524 |
| Example 4 | Fluorine-based ion-exchange membrane | 530 | 529 | 531 | 529 | 529 | 528 | 535 | 533 | 539 | 548 | 550 |
| Comparative Example 1 | Fluorine-based ion-exchange membrane | 549 | 539 | 525 | 538 | 540 | 545 | 558 | 539 | 548 | 540 | 545 |
| Comparative Example 2 | Polystyrene-based ion-exchange resin | 532 | 529 | 498 | 478 | 449 | 447 | 451 | 431 | 448 | 444 | — |

| | The number of times of use (times) | | | | | | | | | Washing timing of catalyst and solvent used |
|---|---|---|---|---|---|---|---|---|---|---|
| | 12 | 13 | 14 | 15 | 16 | 17 | 18 | 19 | 20 | |
| Example 1 | 546 | 538 | 529 | 539 | 543 | 551 | 546 | 550 | 539 | (1) After completion of the 8th cycle: phenol (2) After completion of the 17th cycle: phenol |
| Example 2 | 548 | 539 | 532 | — | — | — | — | — | — | (1) After completion of the 8th cycle: phenol |
| Example 3 | 523 | 525 | 530 | — | — | — | — | — | — | (1) After completion of the 7th cycle: phenol |
| Example 4 | 547 | 539 | 530 | 536 | 541 | 550 | 543 | 549 | 540 | (1) After completion of the 8th cycle: acetone (2) After completion of the 17th cycle: methyl ethyl ketone |

TABLE 4-continued

| | (4) Molecular weight (Mw) of product, | | | | | | | | | |
|---|---|---|---|---|---|---|---|---|---|---|
| Comparative Example 1 | 558 | 549 | 552 | — | — | — | — | — | — | None |
| Comparative Example 2 | — | — | — | — | — | — | — | — | — | None |

Example 5

Ten grams of the sample synthesized in the first cycle in Example 1 was dissolved in 200 mL of tetrahydrofuran (pH of the resulting solution=4.0). Fifty drops of a 10% aqueous solution of sodium hydroxide was added to the resulting solution with a dropping pipette, and 30 drops of a 10% aqueous solution of para-toluenesulfonic acid was added to the solution with a dropping pipette to adjust the pH to 7.5.

The tetrahydrofuran was removed from the resulting solution whose pH was adjusted to 7.5 to obtain a purified dicyclopentadiene-modified phenolic resin. The softening point and the molecular weight of the purified product were measured. The results do not significantly differ from the results of Example 1 (the first cycle). The light transmittance (%) of this sample is shown in Table 5.

TABLE 5

| | Light transmittance (%) | |
|---|---|---|
| | Example 5 | Example 1 |
| Sample | Example 1, The first cycle | |
| pH adjustment | Conducted (7.5) | Not conducted (4.0) |
| Light transmittance (%) | 92 | 78 |

Example 6

Ten grams of the sample synthesized in the 8th cycle in Example 1 was dissolved in 200 mL of tetrahydrofuran (pH of the resulting solution=4.5). Thirty drops of a 10% aqueous solution of sodium hydroxide was added to the resulting solution with a dropping pipette to adjust the pH to 8.0.

The tetrahydrofuran was removed from the resulting solution whose pH was adjusted to 8.0 to obtain a purified dicyclopentadiene-modified phenolic resin. The softening point and the molecular weight of the purified product were measured. The results do not significantly differ from the results of Example 1 (the 8th cycle). The light transmittance (%) of this sample is shown in Table 6.

TABLE 6

| | Light transmittance (%) | |
|---|---|---|
| | Example 6 | Example 1 |
| Sample | Example 1, The 8th cycle | |
| pH adjustment | Conducted (8.0) | Not conducted (4.5) |
| Light transmittance (%) | 90 | 68 |

<Evaluation of Examples and Comparative Examples>

It was found that, in each of the production methods of Examples 1 to 4, when the catalyst of the fluorine-based ion-exchange resin was repeatedly used, coloring of the product was suppressed where the light transmittance was 60% or more, and properties, such as the molecular weight and the softening point, of the product were also stable. On the other hand, in the production method of Comparative Example 1, coloring of the product significantly occurred from the 9th cycle of the use. The softening point and the molecular weight of the resin obtained in Comparative Example 1 are substantially the same as those of the resin obtained in Example 1, and thus, presumably, the performance of the catalyst is not decreased. However, it is believed that since the coloring is significant, the catalyst must be changed in the existing method, resulting in an increase in the cost of the product. On the other hand, in the production method of Comparative Example 2, the molecular weight and the softening point decreased from the 4th cycle of the use, and a DCPD-modified phenolic resin having a stable quality could not be continuously synthesized thereafter.

In the production methods of Examples 5 and 6, a dicyclopentadiene-modified phenolic resin was produced by a method similar to the method in Example 1. In Example 5, the dicyclopentadiene-modified phenolic resin obtained in the first cycle of Example 1 was dissolved in a solvent, and the pH of the resulting solution was adjusted to a particular range. A dicyclopentadiene-modified phenolic resin was then obtained by purifying the solution. The purified dicyclopentadiene-modified phenolic resin had a light transmittance of 92%. Thus, a resin having a very high transparency was obtained (refer to Example 5 in Table 5). In Example 6, the sample obtained in the 8th cycle of Example 1 was similarly treated. The resulting purified dicyclopentadiene-modified phenolic resin had a light transmittance of 90%. Thus, a resin having a very high transparency was obtained (refer to Example 6 in Table 6).

INDUSTRIAL APPLICABILITY

According to the production method of the present disclosure, a DCPD-modified phenolic resin can be produced by repeatedly using a fluorine-based ion-exchange resin catalyst, and generation of waste such as a neutralizer and a neutralized product of a catalyst is suppressed.

Continuous production can be performed while stabilizing properties of the resulting resin, such as the molecular weight, the softening point, and the color tone, and a DCPD-modified phenolic resin having a good quality can be produced at a low cost.

The DCPD-modified phenolic resin obtained by the production method of the present disclosure has a stable quality and a high purity and is inexpensive. Accordingly, the DCPD-modified phenolic resin is useful as a raw material of epoxy resins used in, for example, printed circuit boards and semiconductor sealing materials.

The invention claimed is:

1. A method for producing a dicyclopentadiene-modified phenolic resin, the method comprising:
reusing a fluorine-based ion-exchange resin as a catalyst in a reaction between a phenol and a dicyclopentadiene, the fluorine-based ion-exchange resin having been used as a catalyst when a phenol and a dicyclopentadiene are allowed to react with each other to produce a first dicyclopentadiene-modified phenolic resin,
wherein the fluorine-based ion-exchange resin is washed with an organic solvent.

2. The method for producing a dicyclopentadiene-modified phenolic resin according to claim 1, wherein the fluorine-based ion-exchange resin is washed with the organic solvent and reused at least once before a number of times of repeated use exceeds 30.

3. The method for producing a dicyclopentadiene-modified phenolic resin according to claim 1, wherein when a contaminated state of the fluorine-based ion-exchange resin to be reused is measured and a predetermined standard is not satisfied, the fluorine-based ion-exchange resin is washed with the organic solvent and reused.

4. The method for producing a dicyclopentadiene-modified phenolic resin according to claim 3, wherein the measurement of the contaminated state is a measurement of a spectroscopic spectrum of a solvent extract of the fluorine-based ion-exchange resin to be reused.

5. The method for producing a dicyclopentadiene-modified phenolic resin according to claim 1, wherein the organic solvent for washing the fluorine-based ion-exchange resin to be reused is a phenol.

6. The method for producing a dicyclopentadiene-modified phenolic resin, the method comprising dissolving, in a soluble solvent, the first dicyclopentadiene-modified phenolic resin according to claim 1, adjusting a pH of the resulting solution to 5 to 10, and subsequently removing the soluble solvent to obtain the dicyclopentadiene-modified phenolic resin.

7. The method for producing a dicyclopentadiene-modified phenolic resin according to claim 4, wherein the solvent extract of the fluorine-based ion-exchange resin has a light transmittance of 40% or more at 450 nm when the phenol and the dicyclopentadiene are allowed to react with each other to produce the first dicyclopentadiene-modified phenolic resin.

8. The method for producing a dicyclopentadiene-modified phenolic resin according to claim 2, wherein when a contaminated state of the fluorine-based ion-exchange resin to be reused is measured and a predetermined standard is not satisfied, the fluorine-based ion-exchange resin is washed with the organic solvent and reused.

9. The method for producing a dicyclopentadiene-modified phenolic resin according to claim 8, wherein the measurement of the contaminated state is a measurement of a spectroscopic spectrum of a solvent extract of the fluorine-based ion-exchange resin to be reused.

10. The method for producing a dicyclopentadiene-modified phenolic resin, the method comprising dissolving, in a soluble solvent, the first dicyclopentadiene-modified phenolic resin according to claim 2, adjusting a pH of the resulting solution to 5 to 10, and subsequently removing the soluble solvent to obtain the dicyclopentadiene-modified phenolic resin.

11. The method for producing a dicyclopentadiene-modified phenolic resin, the method comprising dissolving, in a soluble solvent, the first dicyclopentadiene-modified phenolic resin according to claim 3, adjusting a pH of the resulting solution to 5 to 10, and subsequently removing the soluble solvent to obtain the dicyclopentadiene-modified phenolic resin.

12. The method for producing a dicyclopentadiene-modified phenolic resin, the method comprising dissolving, in a soluble solvent, the first dicyclopentadiene-modified phenolic resin according to claim 4, adjusting a pH of the resulting solution to 5 to 10, and subsequently removing the soluble solvent to obtain the dicyclopentadiene-modified phenolic resin.

13. The method for producing a dicyclopentadiene-modified phenolic resin, the method comprising dissolving, in a soluble solvent, the first dicyclopentadiene-modified phenolic resin according to claim 5, adjusting a pH of the resulting solution to 5 to 10, and subsequently removing the soluble solvent to obtain the dicyclopentadiene-modified phenolic resin.

14. The method for producing a dicyclopentadiene-modified phenolic resin, the method comprising dissolving, in a soluble solvent, the first dicyclopentadiene-modified phenolic resin according to claim 8, adjusting a pH of the resulting solution to 5 to 10, and subsequently removing the soluble solvent to obtain the dicyclopentadiene-modified phenolic resin.

15. The method for producing a dicyclopentadiene-modified phenolic resin, the method comprising dissolving, in a soluble solvent, the first dicyclopentadiene-modified phenolic resin according to claim 9, adjusting a pH of the resulting solution to 5 to 10, and subsequently removing the soluble solvent to obtain the dicyclopentadiene-modified phenolic resin.

* * * * *